United States Patent
Baecher et al.

(10) Patent No.: US 7,142,007 B2
(45) Date of Patent: Nov. 28, 2006

(54) LOW POWER DIGITAL ADAPTIVE TERMINATION NETWORK

(75) Inventors: Matthew B. Baecher, Newburg, NY (US); James Stephen Mason, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/960,142

(22) Filed: Oct. 7, 2004

(65) Prior Publication Data
US 2005/0083079 A1   Apr. 21, 2005

(30) Foreign Application Priority Data
Oct. 21, 2003   (GB) .................................. 0324516.4

(51) Int. Cl.
*H03K 17/16* (2006.01)

(52) U.S. Cl. .......................... 326/30; 326/46; 327/108

(58) Field of Classification Search ................. 326/30, 326/86; 327/108
See application file for complete search history.

(56) References Cited

U.S. PATENT DOCUMENTS

| 5,652,538 A | 7/1997 | Boudry et al. ............. 327/403 |
| 6,157,206 A * | 12/2000 | Taylor et al. ................. 326/30 |
| 6,380,758 B1 * | 4/2002 | Hsu et al. ...................... 326/30 |
| 6,541,996 B1 * | 4/2003 | Rosefield et al. ............. 326/30 |
| 6,756,858 B1 * | 6/2004 | Gonzalez et al. .......... 333/17.3 |
| 6,963,218 B1 * | 11/2005 | Alexander et al. ............ 326/30 |
| 2005/0040845 A1 * | 2/2005 | Park ............................. 326/30 |

* cited by examiner

Primary Examiner—Vibol Tan
(74) Attorney, Agent, or Firm—Kunzler & Associates

(57) ABSTRACT

An apparatus, method, microprocessor device and computer program for configuring a termination network of a communication device includes a voltage comparator for comparing a voltage across the termination network with a reference voltage; a logic arrangement for setting a digital control vector in response to a state returned by said voltage comparator; and a first switching apparatus for activating a first weighted-value resistor in response to the setting of the digital control vector. At least a second switching apparatus for activating a second weighted-value resistor, and wherein each of the first and the second weighted-value resistors is represented by a value in the digital control vector may be provided, the first and second resistors are connected in series or in parallel. The digital control vector may be stored in a logic register and distributed to a plurality of termination networks. The logic arrangement may include a finite state machine.

30 Claims, 4 Drawing Sheets

LOW POWER DIGITAL ADAPTIVE TERMINATION NETWORK

BACKGROUND OF THE INVENTION

1. Field of the Invention

The present invention relates to an apparatus and method for an adaptive resistor termination network for use in tuning an integrated network to provide a desired value of resistance.

2. Description of the Related Art

Documents known in the art describe how the output impedance of a voltage driver can be modified by using multiple parallel pull up and pull down transistors in an output driver and selecting the number of active devices to achieve the required output impedance (as disclosed in U.S. Pat. No. 5,134,311). U.S. Pat. No. 6,026,456 uses a termination network with a higher impedance than the bus impedance which it is controlling to optimise the bus impedance.

One possible approach is one using a linear technique to trim the main resistor in termination system. Although relatively simple to implement, this system has the disadvantage of static power consumption which can be significant in low power applications. In addition, when multiple termination networks are needed to be controlled from a single termination system then an analog voltage needs to be distributed to these networks, and this is susceptible to interference and error.

U.S. Pat. No. 5,652,538 describes a digital solution problem using a network where parallel elemental conductances are switched in and out of circuit by a digital controller to attain the required impedance.

It would therefore be desirable to have an apparatus and method for an adaptive resistor termination network for use in tuning an integrated network to provide a desired value of resistance with improved characteristics of error-resistant operation, tunability and low power-consumption.

SUMMARY OF THE INVENTION

The present invention accordingly provides, in a first aspect, an apparatus for configuring a termination network of a communication device comprising a voltage comparator for comparing a voltage across the termination network with a reference voltage; a logic arrangement for setting a digital control vector responsive to a state returned by said voltage comparator; and a first switching apparatus for activating a first weighted-value resistor responsive to the setting of the digital control vector.

The apparatus may further comprise at least a second switching apparatus for activating a second weighted-value resistor, and wherein each of the first and the second weighted-value resistors is represented by a value in the digital control vector.

Suitably, the first and the second weighted-value resistors may be connected in series or in parallel.

Preferably, the digital control vector is stored in a logic register.

Preferably, the digital control vector is distributed to a plurality of termination networks.

Preferably, the logic arrangement comprises a finite state machine.

In a second aspect, the present invention provides a microprocessor device including an apparatus for configuring a termination network of a communication device, and comprising a voltage comparator for comparing a voltage across the termination network with a reference voltage; a logic arrangement for setting a digital control vector responsive to a state returned by said voltage comparator; and a first switching apparatus for activating a first weighted-value resistor responsive to the setting of the digital control vector.

Preferred features of the second aspect respectively embody in microprocessor form, the preferred apparatus features according to the first aspect.

In a third aspect, the present invention provides a method for configuring a termination network of a communication device comprising comparing a voltage across the termination network with a reference voltage; setting a digital control vector responsive to a state returned by said voltage comparator; and activating a first weighted-value resistor responsive to the setting of the digital control vector.

The method of the third aspect preferably further comprises at least a step of activating a second weighted-value resistor, and wherein each of the first and the second weighted-value resistors is represented by a value in the digital control vector.

Suitably, the first and the second weighted-value resistors may be connected in series or in parallel.

Preferably, the first and the second weighted-value resistors are connected in parallel.

Preferably, the digital control vector is stored in a logic register.

Preferably, the digital control vector is distributed to a plurality of termination networks.

Preferably, the logic arrangement comprises a finite state machine.

In a fourth aspect, the present invention provides a computer program product tangibly stored in a computer readable medium and comprising computer program code to, when loaded into a computer system and executed thereon, cause said computer system to configure a termination network of a communication device, said computer program code comprising code means for comparing a voltage across the termination network with a reference voltage; code means for setting a digital control vector responsive to a state returned by said voltage comparator; and code means for activating a first weighted-value resistor responsive to the setting of the digital control vector.

The computer program product preferably further comprises at least code means for activating a second weighted-value resistor, and wherein each of the first and the second weighted-value resistors is represented by a value in the digital control vector.

Suitably, the first and the second weighted-value resistors may be connected in series or in parallel.

Preferably, the first and the second weighted-value resistors are connected in parallel.

Preferably, the digital control vector is stored in a logic register.

Preferably, the digital control vector is distributed to a plurality of termination networks.

Preferably, the logic arrangement comprises a finite state machine.

The present invention advantageously compensates for the tolerance of integrated resistors and provides a more accurate value of resistance than could be obtained with an uncompensated component. There are various applications where well controlled on-chip resistor networks are desirable, an example being the termination of transmission line systems to optimise signal quality.

The system of the preferred embodiments of the present invention advantageously corrects the tolerance on a integrated resistor by switching in parallel correcting elements.

This technique minimises the devices required since the system is compensating only for the error on the main component, which minimises the parasitic loading of the network. Reduced parasitics are important in high frequency applications providing improved device performance.

The controller advantageously operates by regulating the resistor of the termination network. However such a termination network is often used at high frequencies and it is therefore important that, at the frequency of operation, the impedance of the network is close to its DC impedance or resistance. By using this trimming approach with weighted components and minimising the parasitics introduced by the correcting devices, the overall reactance component of the termination network is further advantageously minimised. In using weighted rather than elemental (equal-valued) components to provide the correction to the main component, a smaller network can be achieved with the associated advantage of reduced circuit area and reduced parasitics.

The system according to the preferred embodiment is low power since significant power is only consumed during the calibration process, thereafter the required state of the control vector can be held in a logic register and the static current paths in the controller are disabled.

The system is also well suited for operation at low supply voltages since the tuning of the resistor network is controlled through digital switches. The design of the analog content of the controller minimises the voltage headroom requirements.

By using integrated resistors with the active devices acting predominantly as switches, the overall network can have good linear performance. A low variation of impedance with applied voltage is desirable since the network may experience a substantially different voltage than the reference network operating with the controller.

The resistance value set by the controller can be made to be set primarily by the value of a reference resistor and is consequently independent of any other variables (to a first approximation) with the scheme according to the preferred embodiment of the present invention. This reference resistor can be made an external component (that is, external to the chip) with tight control of its value and tolerance. Moreover this reference device is operating at DC and does not need to maintain its accuracy at the signal frequencies experienced by the termination network itself.

The system is well suited for implementation where many networks need to be controlled on a single chip since the control vector can easily be distributed across a chip. The use of a digital vector of appropriate design allows cross talk and noise coupling between networks to be effectively eliminated.

If a switch was also included in series with the main resistor (Rm in FIG. 1) then a very wide range of network resistance could be achieved. This could be desirable in certain applications, for example device test, where a high value of resistance could be set by for example just selecting the least significant bit device. In situations where AC coupling is present, a high value of resistance could allow lower frequencies of operation to be achieved within such a system which may be a useful feature during device test.

The digital control vector also allows the opportunity to provide a fine offset control on the resistor value of the termination network. This facility could be useful for some further adaptive control of the network in addition to that provided by the resistor controller.

Further advantageously, a relatively simple finite state machine can be used to implement the controller for this system with the associated advantages in power dissipation and circuit area. The calibration information can be held in memory as a static control vector enabling very low average power dissipation for this system.

U.S. Pat. No. 6,026,456, referred to above in the background discussion, identifies the difficulty of matching lines to their characteristic impedance and does not terminate the line with an impedance which matches its characteristic impedance. In high speed data communication and RF transmission systems, it is advantageous to terminate the transmission system with its characteristic impedance.

A system according to the present invention which predominantly controls impedance, as opposed to, for example, the output impedance of a voltage driver, has the advantage that the system can be used at both the transmit and receive ends of the link. At the driver side, a current driver can be used to develop a voltage in the termination system or a voltage driver of low internal impedance (compared to the termination impedance) could be used to drive the line through the termination system. There are also other advantages such as matching to be gained from employing the same termination system at both ends of the transmission system.

A system according to the present invention which corrects the error on a main resistor is preferable over one defining the full network impedance as in U.S. Pat. No. 5,652,538 described above. By using weighted, rather than elemental parallel elements, a network with a smaller number of elements for a given range of control is possible. This is advantageous for high frequency applications in reducing the silicon area of the termination which also reduces the associated device parasitics, allowing the impedance control to be maintained at higher frequencies. The embodiments of the present invention are also well suited for low voltage operation and provide advantages for the control of multiple networks from a single controller and the ability to significantly change the network impedance for special situations such as device test.

If a switch is also included in series with the main resistor (Rm in FIG. 1), a very wide range of network resistance can be achieved. This wide range of network resistance would be advantageous in certain applications. For example, in device test where a high value of resistance could be set by selecting, say, only the least significant bit device. In situations where AC coupling is present, a high value of resistance would allow lower frequencies of operation to be achieved within the system, which offers advantages during device test.

The use of a digital control vector also advantageously allows the opportunity to provide a fine offset control on the resistor value of the termination network. This facility could be useful for additional adaptive control of the network over that provided by the resistor controller. In this application of the present invention, an offset is preferably applied to the control vector which relates to one value of resistance to determine a second value at a reduced, but acceptable, level of accuracy.

BRIEF DESCRIPTION OF THE DRAWINGS

A preferred embodiment of the invention will now be described, by means of examples only, with reference to the accompanying drawings in which.

DETAILED DESCRIPTION OF THE INVENTION

Figure 1:
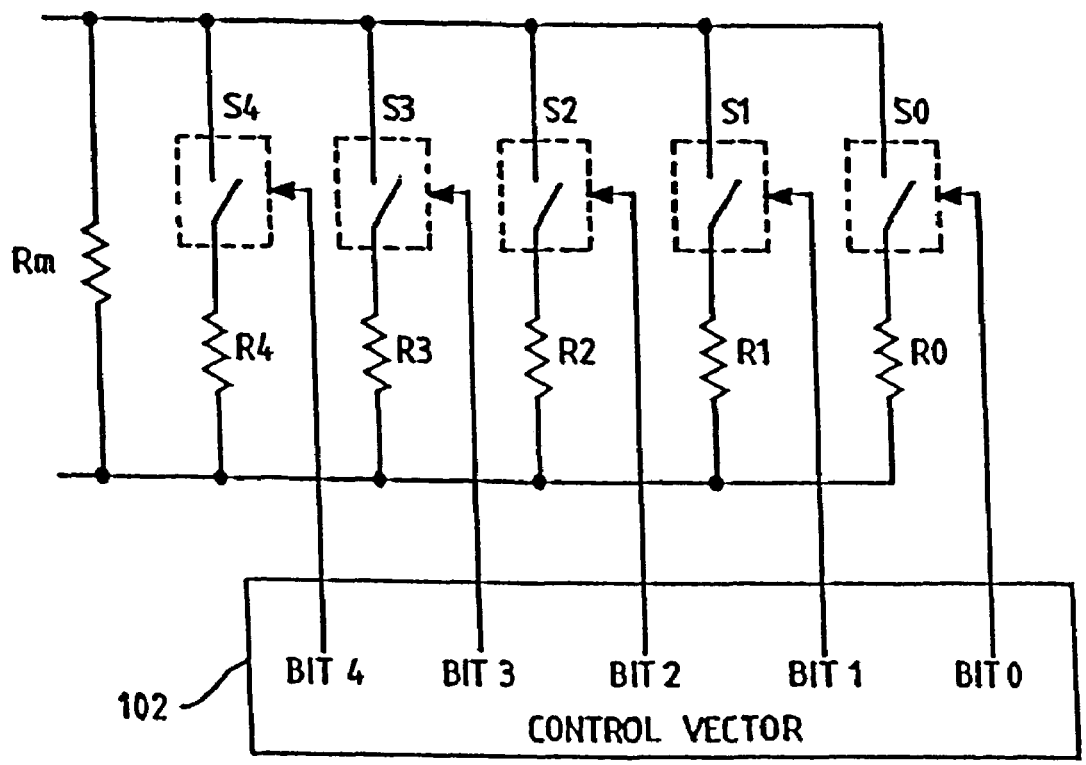
FIG. 1 is a simplified circuit diagram of a termination network according to a preferred embodiment of the present invention.
Figure 1A:
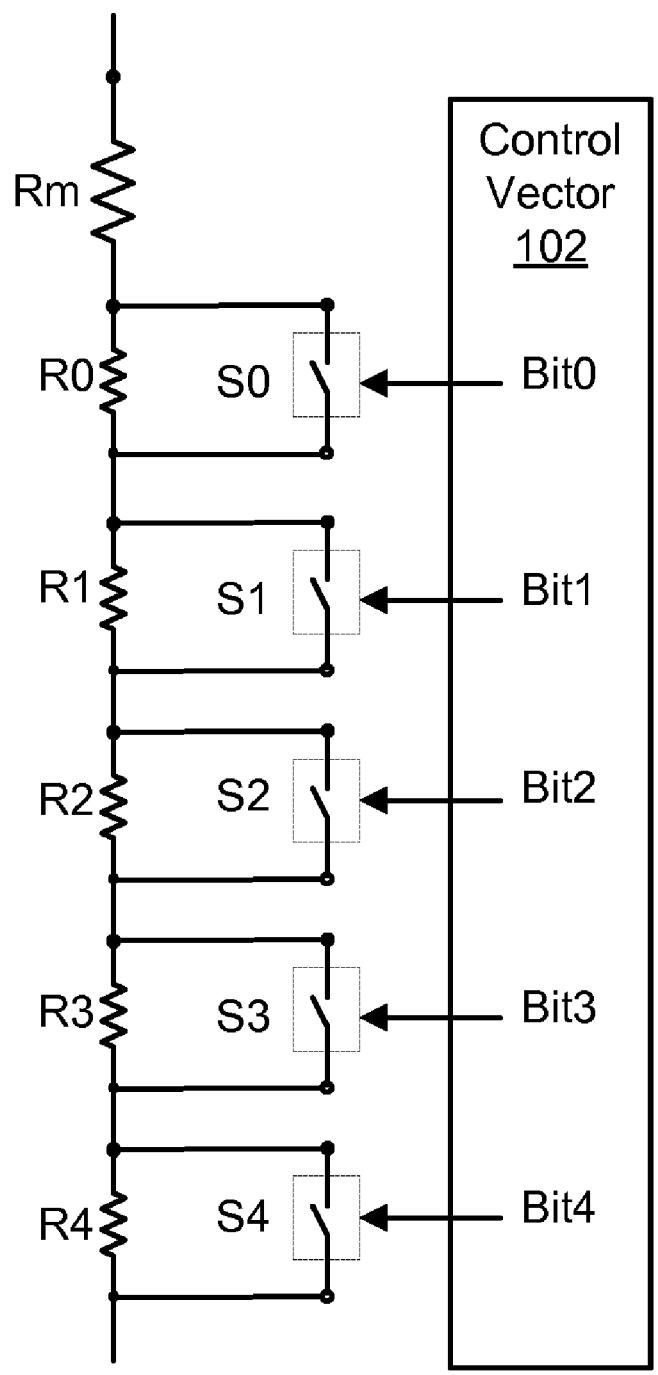
FIG. 1A is a simplified circuit diagram of an alternate termination network according to a preferred embodiment of the present invention.

The adaptive network of the preferred embodiment of the present invention uses parallel components to compensate for the tolerance on a main resistor Rm. An example of such a system is shown in FIG. 1 where the trimming resistors R0–R4 are connected, via their respective switches S0–S4, in parallel with main resistor Rm. These weighted parallel components are switched in or out by action of a digital control vector 102 which in the preferred embodiment is 5 bits wide (Bit0–Bit4). The main resistor Rm is set to have a higher value than the target value of the network by its maximum tolerance and the trimming parallel resistors R0–R4 are set such that their total contribution to the network compensates for the extra resistance of main resistor Rm at its maximum tolerance case, and are appropriately weighted. In this way the network can be made to attain a value close to its target value with a final accuracy set by the resolution of the digital control vector 102. The system is effectively only connecting for the tolerance on the main resistor Rm. This advantageously reduces the signal current which needs to be carried by the correcting elements and also reduces the parasitic loading of the overall termination network. It will, however, be clear to one skilled in the art that there are other network topologies which could also be used, for example, the trimming resistors R0–R4 could be wired in series with the main resistor Rm which in this case would be set to have a lower value than the target value (see FIG. 1A).

Figure 2:
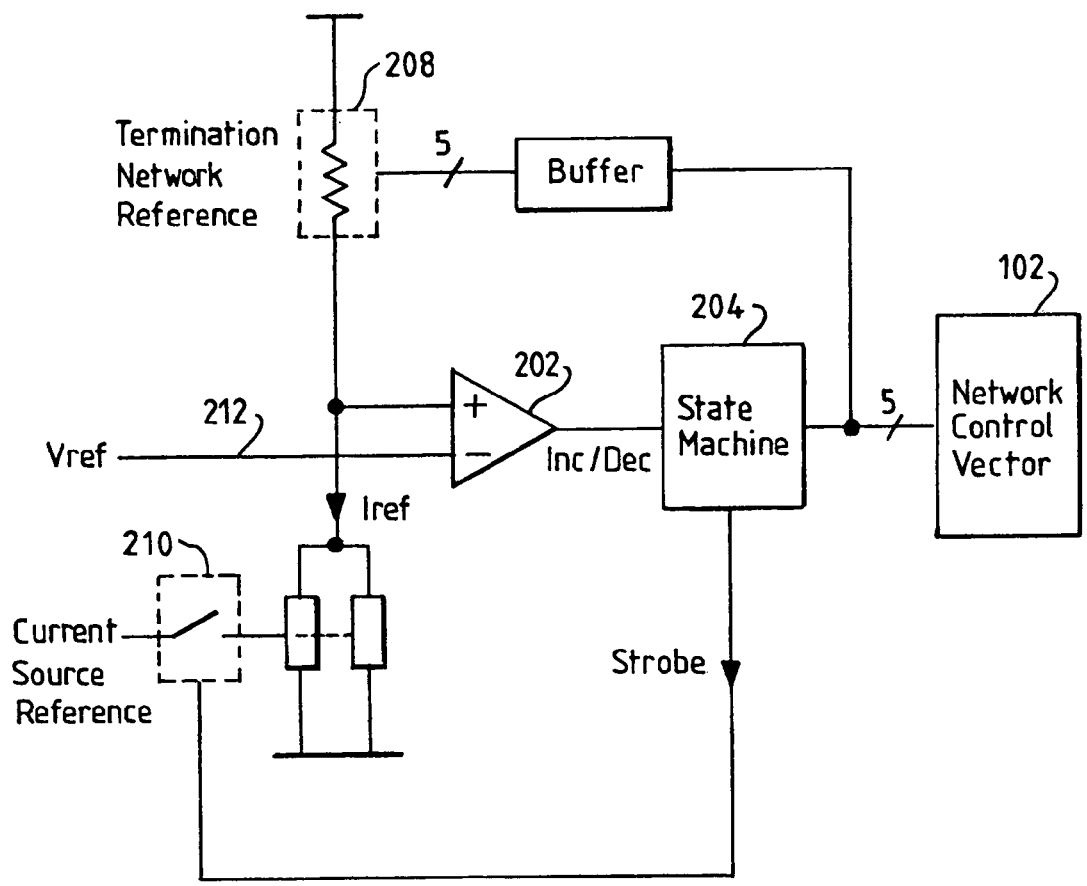
FIG. 2 is an overall block diagram of a digital termination network controller according to a preferred embodiment of the present invention.

The control system by which the termination network is controlled is shown in FIG. 2. A voltage is defined across a reference network using a known reference current (Iref) during the calibration sequence using a strobe signal. The voltage developed across the network is compared with a reference voltage (Vref) using a comparator 202, the output of which is sensed by a state machine 204. The state machine then adjusts the value of the control vector 102 to adjust the network so that the voltage developed across it is equal to the reference voltage. In a preferred embodiment of the present invention, the control system adjusts the reference network to have a resistor value, given by Vref/Iref. If an external resistor is used to define Iref from Vref then the value of the reference network resistance will be proportional to the external resistor value and independent of Vref. In this way it is possible to accurately control the value of the integrated resistor network which ideally is solely dependant upon the value of the external resistor value and its tolerance.

The control vector 102 can be used to set other resistor networks of the same design as the reference network and in this way a single controller system can be used to set multiple networks distributed across a chip. The accuracy of the resistance value on these 'slave' networks is set by the accuracy of the controller system itself, together with the matching tolerance between the slave and reference networks.

The system according to a most preferred embodiment thus comprises a logic section which implements the state machine 204 function of FIG. 2 and an analog section which contains the termination network reference 208, current source 210, voltage reference Vref 212 and comparator 202. These components are described in greater detail below.

Figure 3:
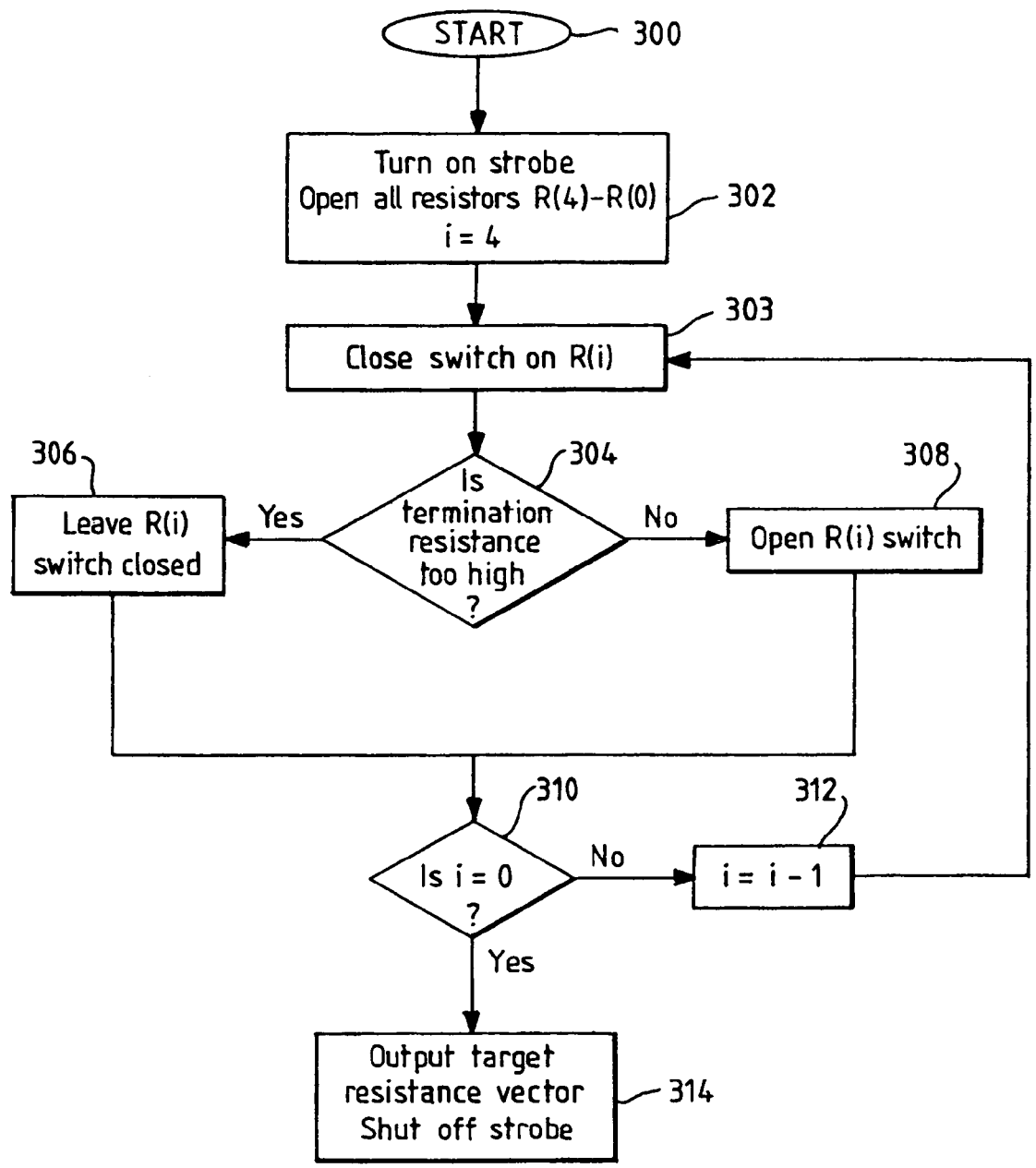
FIG. 3 is a flow diagram illustrating the processing behaviour of a controller according to a preferred embodiment of the present invention.

A flow chart showing one possible implementation of the state machine for the logic section of the termination controller is shown in FIG. 3. Following the start of the calibration process 300, the strobe line is turned on at 302, which enables the analog circuitry and switches on the current source that develops a voltage Vref 212 across the termination network reference. The state of the digital control vector 102 controlling the termination network is reset. In the preferred embodiment of the present invention this is achieved by opening all the switches (S0–S4).

Starting with the most significant bit, an iterative loop structure is established (i=4 for this five bit system where 4 is the most significant bit and 0 is the least significant bit), the associated switch on the termination network is closed at 303 and the output of the comparator 202 is sensed at 304. If the output of the comparator 202 is 0 (as shown in exemplary FIG. 2), the termination resistance is set too high and the switch should remain closed at 306.

Alternatively, if the termination resistance is set too low then the switch is opened again at 308. This process is repeated for each successive bit until the iteration for the least significant bit (i=0) has been completed. The loop tests for i=0 at 310 and decrements i at 312 until the test at 310 returns Yes. The iterative loop process then terminates at 314. This algorithm will set the termination resistance to be below the desired system target value by a value up to the least significant bit contribution. It will be clear to one skilled in the art that many alternatives are possible, but in some applications it is desirable for the value to be slightly below the target value such that the wiring resistance, which may be outside the control loop, brings the total resistance closer to the actual system target value.

Thus, at 314, the output vector is stored and the strobe is turned off. In this way the quiescent current within the controller circuits can be reduced to a very low level so that the termination control system is in a low power state when outside the calibration cycle. This algorithm can advantageously be easily implemented within standard logic on-chip. The digital vector can further advantageously be buffered and distributed around a chip to control multiple termination networks.

The method according to preferred embodiments of the present invention is suitable to be embodied in a logic arrangement permanently or temporarily established in a hardware apparatus in the form of firmware elements or logic elements of an ASIC.

In an alternative, all or part of the present invention may be implemented in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may thus suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It will be clear to one of ordinary skill in the art that many improvements and modifications can be made to the foregoing exemplary embodiments without departing from the scope of the present invention.

What is claimed is:

1. An apparatus for configuring a termination network of a communication device, the apparatus comprising:
    at least one trimming component, each trimming component having an associated switch for selectively connecting the trimming component to a main resistor in response to a corresponding bit in a digital control vector;
    a voltage comparator for generating an output bit having a first value if a net value of voltage across the main resistor and any connected trimming components exceeds a desired voltage value; and
    a logic arrangement connected to the switches and to the voltage comparator for generating the digital control vector in dependence on the output bit of the voltage comparator, wherein the logic arrangement generates the control vector by sequentially changing each bit of the control vector until the voltage across the main resistor and any connected trimming components reaches the desired voltage value.

2. The apparatus of claim 1, wherein the at least one trimming component, associated switch, and main resistor form a termination network reference and further comprising a current reference configured to generate a reference current through the termination network reference.

3. The apparatus of claim 2, wherein the logic arrangement comprises a state machine that proceeds through a fixed number of states.

4. The apparatus of claim 3, wherein the state machine activates the current reference during each state.

5. The apparatus of claim 3, wherein the state machine, upon reaching a final state, outputs the digital control vector and stops generating the current reference.

6. The apparatus of claim 2, wherein the desired voltage value divided by the current reference comprises a desired resistance of the termination network reference.

7. The apparatus of claim 1, wherein the digital control vector is distributed to a plurality of termination networks.

8. The apparatus of claim 1, wherein the at least one trimming component and associated switch comprises a plurality of trimming components, each with an associated switch, and each trimming component comprises a different weighted value.

9. The apparatus of claim 1, wherein the main resistor is connected in parallel with the at least one trimming component and associated switch connected in series.

10. A system for configuring a termination network of a communication device, the system comprising:
    a communication device; and
    a termination network connected to the communication device comprising
        at least one trimming component, each trimming component having an associated switch for selectively connecting the trimming component to a main resistor in response to a corresponding bit in a digital control vector;
        a voltage comparator for generating an output bit having a first value if a net value of voltage across the main resistor and any connected trimming components exceeds a desired voltage valve; and
        a logic arrangement connected to the switches and to the voltage comparator for generating the digital control vector in dependence on the output bit of the voltage comparator, wherein the logic arrangement generates the control vector by sequentially changing each bit of the control vector until the voltage across the main resistor and any connected trimming components reaches the desired voltage value.

11. The system of claim 10, wherein the at least one trimming component, associated switch, and main resistor form a termination network reference and further comprising a current reference configured to generate a reference current through the termination network reference.

12. The system of claim 11, wherein the logic arrangement comprises a state machine that proceeds through a fixed number of states.

13. The system of claim 12, wherein the state machine activates the current reference during each state.

14. The system of claim 12, wherein the state machine, upon reaching a final state, outputs the digital control vector and stops generating the current reference.

15. The system of claim 10, wherein the digital control vector is distributed to a plurality of termination networks.

16. The system of claim 10, wherein the main resistor is connected in series with the at least one trimming component and associated switch connected in parallel.

17. A method for configuring a termination network of a communication device comprising:
    selectively connecting at least one trimming component to a main resistor in response to a corresponding bit in a digital control vector, each trimming component having an associated switch for connecting the trimming component to the main resistor;
    generating a first value of an output bit of a voltage comparator if a net value of voltage across the main resistor and any connected trimming components exceeds a desired voltage value; and
    generating the digital control vector in a logic arrangement in dependence on the output bit of the voltage comparator, wherein the logic arrangement generates the control vector by sequentially changing each bit of the control vector until the voltage across the main resistor and any connected trimming components reaches the desired voltage value.

18. The method as claimed in claim 17, further comprising generating a reference current through a termination network reference, the termination network reference comprising the at least one trimming component, associated switch, and main resistor.

19. The method as claimed in claim 18, further comprising proceeding through a fixed number of states.

20. The method as claimed in claim 19, further comprising activating the current reference during each state.

21. The method as claimed in claim 19, further comprising, upon reaching a final state, outputting the digital control vector and stopping generation of the current reference.

22. The method as claimed in claim 17, wherein the digital control vector is distributed to a plurality of termination networks.

23. The method as claimed in claim 17, wherein the logic arrangement comprises a finite state machine.

24. A signal bearing medium tangibly embodying a program of machine-readable instructions executable by a digital processing apparatus to perform an operation to configure a termination network of a communication device, the operations comprising:

selectively connecting at least one trimming component to a main resistor in response to a corresponding bit in a digital control vector, each trimming component having an associated switch for connecting the trimming component to the main resistor;

generating a first value of an output bit of a voltage comparator if a net value of voltage across the main resistor and any connected trimming components exceeds a desired voltage value; and generating the digital control vector in a logic arrangement in dependence on the output bit of the voltage comparator, wherein the logic arrangement generates the control vector by sequentially changing each bit of the control vector until the voltage across the main resistor and any connected trimming components reaches the desired voltage value.

25. The signal bearing medium of claim 24, wherein the instructions further comprise an operation to generate a reference current through a termination network reference, the termination network reference comprising the at least one trimming component, associated switch, and main resistor.

26. The signal bearing medium of claim 25, further comprising an instruction to proceed through a fixed number of states.

27. The signal bearing medium of claim 26, further comprising an instruction to activate the current reference during each state.

28. The signal bearing medium of claim 26, further comprising an instruction to, upon reaching a final state, output the digital control vector and to stop generation of the current reference.

29. The signal bearing medium of claim 24, wherein digital control vector is stored in a logic register.

30. The signal bearing medium of claim 24, wherein the logic arrangement comprises a finite state machine.

* * * * *